Aug. 29, 1961 E. M. AUST 2,998,106

MOBILE ELEVATING AND ERECTING DEVICE FOR MASTS ASSEMBLED FROM SEPARATE SECTIONS

Filed June 13, 1956 10 Sheets-Sheet 1

INVENTOR.
EDMUNDO MAXIMILIANO AUST
BY Leon M. Strauss
AGT.

INVENTOR.
EDMUNDO MAXIMILIANO AUST
BY
Agt.

INVENTOR.
EDMUNDO MAXIMILIANO AUST
BY [signature]
AGT.

INVENTOR.
EDMUNDO MAXIMILIANO AUST
BY Leon M. Strauss
AGT.

INVENTOR.
EDMUNDO MAXIMILIANO AUST
BY
[signature] Agt.

INVENTOR.
EDMUNDO MAXIMILIANO AUST
BY Leon M. Strauss
AGT.

INVENTOR.
EDMUNDO MAXIMILIANO AUST
BY [signature]
AGT.

INVENTOR.
EDMUNDO MAXIMILIANO AUST
BY Leon M. Strauss
Agt.

Aug. 29, 1961 E. M. AUST 2,998,106

MOBILE ELEVATING AND ERECTING DEVICE FOR MASTS ASSEMBLED FROM SEPARATE SECTIONS

Filed June 13, 1956 10 Sheets-Sheet 9

INVENTOR.

EDMUNDO MAXIMILIANO AUST

BY [signature] Agt.

INVENTOR.
EDMUNDO MAXIMILIANO AUST
BY [signature]
AGT.

United States Patent Office 2,998,106

Patented Aug. 29, 1961

2,998,106

MOBILE ELEVATING AND ERECTING DEVICE FOR MASTS ASSEMBLED FROM SEPARATE SECTIONS

Edmundo Maximiliano Aust, Vaduz, Liechtenstein, assignor to Atag-Trust, Vaduz, Liechtenstein, a company of Liechtenstein Filed June 13, 1956, Ser. No. 591,192
Claims priority, application Switzerland June 30, 1955
4 Claims. (Cl. 189—11)

The present invention relates to a mobile elevating and erecting device for masts assembled from separate sections.

For many technical purposes, for instance in building, radio and television engineering, communications and transportation, upright and work masts are frequently required which must sometimes have a height of 60 metres and more, but do not need to remain in operation long enough to justify the construction of a stationary mast.

The present invention is intended to solve the problem of providing a mast which can be constructed from individual elements from below, which is capable of universal application i.e. is not restricted in use to one particular purpose, for instance that of a building crane mast—which is, moreover, quickly and reliably erected and moved, and, where required, easy for one operator to assemble, dismantle and control if, for instance, it is used as a work mast and has to be turned or swivelled. The universal application of the mast also entails the possibility of bringing it as quickly as possible to any desired place in the dismantled state with the aid of the vehicle carrying the erecting scaffolding, the vehicle itself serving as a store for the mast elements; it is furthermore necessary to provide devices for separating the erected mast, in a given case, from the scaffolding and anchoring it in the ground as an independent structure. Finally, it must also be possible to run out the mast freely without the guy ropes, if such are required, needing to be kept under tension.

There already exist—chiefly for building purposes—transportable mast constructions assembled from individual mast sections which are used to construct the mast from below inside an erecting scaffolding. To this end a raisable and lowerable platform is provided inside an erecting scaffolding mounted on casters. With the aid of this platform the mast elements are raised to a certain height, held there and joined to another mast element attached from below. Such wheeled and composite mast constructions, however, are as a rule comparatively small in height, are intended only for very definite purposes and are designed solely with those purposes in view.

The present invention is characterized by a laterally hinged guide frame which is displaceable inside the vertical guide of the erecting scaffolding, has in its interior guide rollers for the individual mast sections and is provided with locking members to support the mast sections vertically raised by the guide frame at such a height that another mast section can be placed between the lowered elevating table and the raised mast section.

The erecting scaffolding including the guide frame can be horizontally mounted on a vehicle so as to rotate and/or swivel about a horizontal axis. The guide frame is suitably mounted so that it can be raised and lowered and locked in its top position. For the purpose of releasing an enclosed mast section from the guide frame, the latter may be provided with a lockable door. In order to support the mast sections, swing-out supporting levers are provided in the guide frame, which levers can engage the slots on the mast sections.

The mast sections to be inserted in the guide frame are suitably equipped with members for centering the following mast section. Furthermore, toggle-lever fastenings can be arranged on the mast sections for the purpose of connecting the individual sections. Similarly, grooves on the individual mast sections as well as noses engaging said grooves can be provided so as to join the sections reliably together and to prevent torsion. Plug-in fastenings, which can be closed by means of control members in the guide frame when the mast sections are slid through, can also be used to join the individual sections.

Other features and characteristics of the invention will be revealed by the following specification in which the invention is explained in detail in conjunction with the attached drawing.

Two embodiments of the invention are illustrated by way of example in the drawing, in which:

FIG. 1 is an elevating and erecting device mounted on a horizontal turntable on a vehicle and designed for erecting masts consisting of separate sections;

FIG. 2 is a rear view of the vehicle according to FIG. 1;

FIGS. 3 and 4 show the outlines of a trailer, in which the erecting device is incorporated, seen from the side and from above respectively;

FIG. 5 is a view of the trailer in the direction of arrow *a* in FIG. 3, shown on an enlarged scale;

FIG. 6 is a section taken along the line I—I in FIG. 7;

FIG. 7 is a top view with a partial section taken along the line II—II in FIG. 5;

FIG. 8 is a section through the trailer, taken along the line III—III in FIG. 7;

FIG. 9 is a raisable and lowerable guide frame shown partly in section;

FIG. 10 is a section taken along the line IV—IV in FIG. 9;

FIG. 11 is a section taken along the line V—V in FIG. 9;

FIG. 12 is a side view of two tubular mast sections placed end to end;

FIG. 13 is a side view of the top part of a tubular mast section;

FIG. 14 shows the device with several mast sections mounted one on top of the other and suspended in the guide frame, the device being in the position preparatory to adding another mast section;

FIG. 15 shows how the mast is provided with a pedestal and lowered on to a seat;

FIG. 16 shows the mast lowered on to a seat;

FIG. 17 shows how the trailer can be driven away from the mast which has been lowered on to a base.

FIG. 18 is a section taken along the line VI—VI in FIG. 19;

FIG. 19 is a section taken along the line VII—VII in FIG. 18;

FIG. 20 is a cross-section of the elevating table with spring-mounted insert;

Figures 18, 19, 20, 20A, 20B:
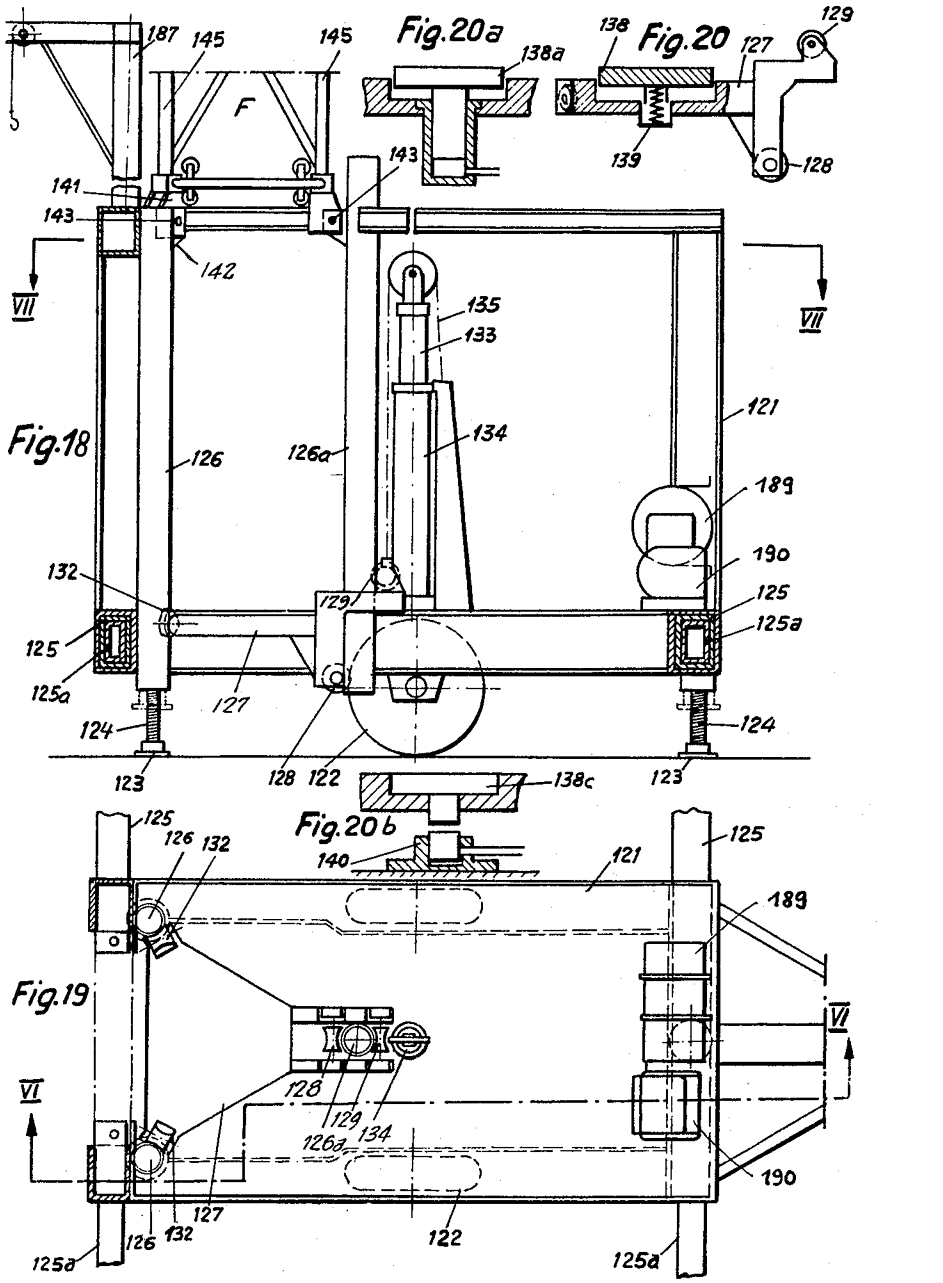
FIGS. 18–27 illustrate a modified embodiment which is designed for the assembly of lattice masts of angular cross-section. In these figures.
Figures 21, 22, 25, 26, 27:
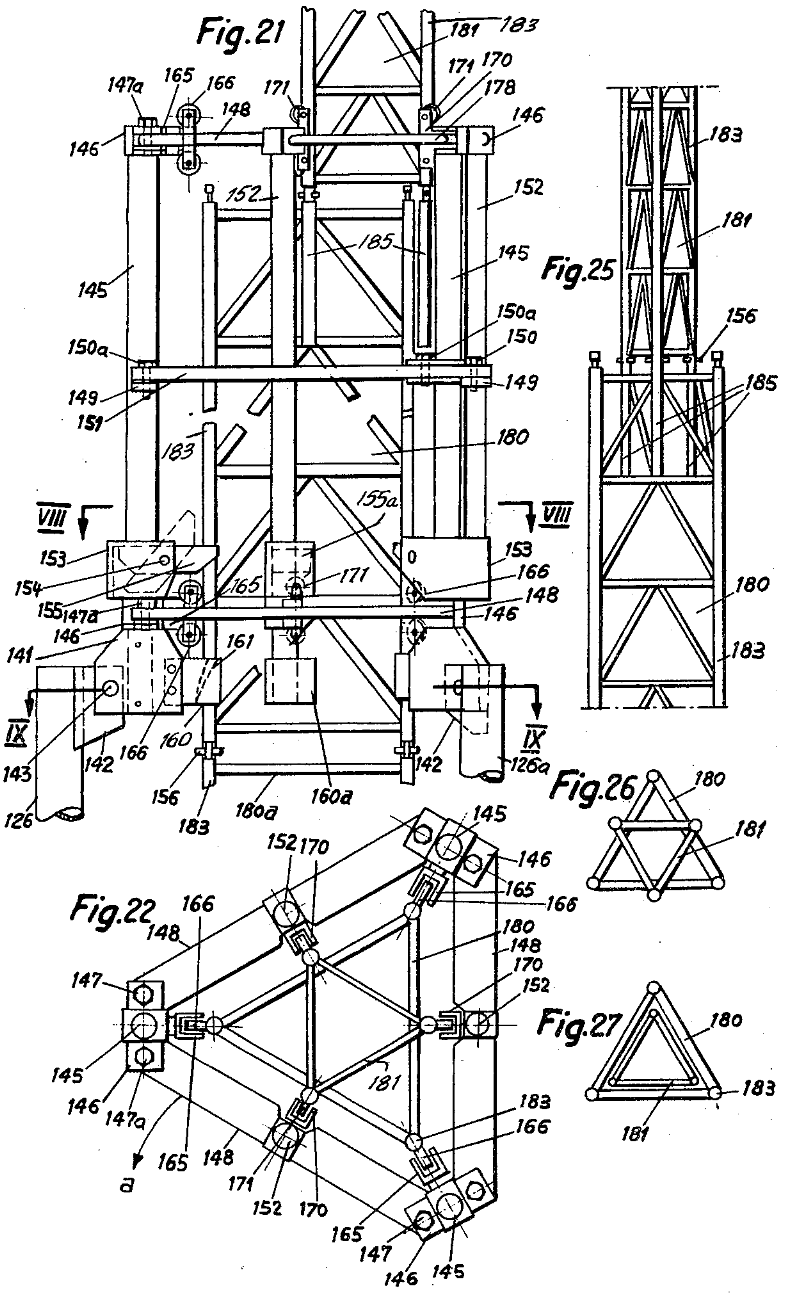
Figures 23, 24:
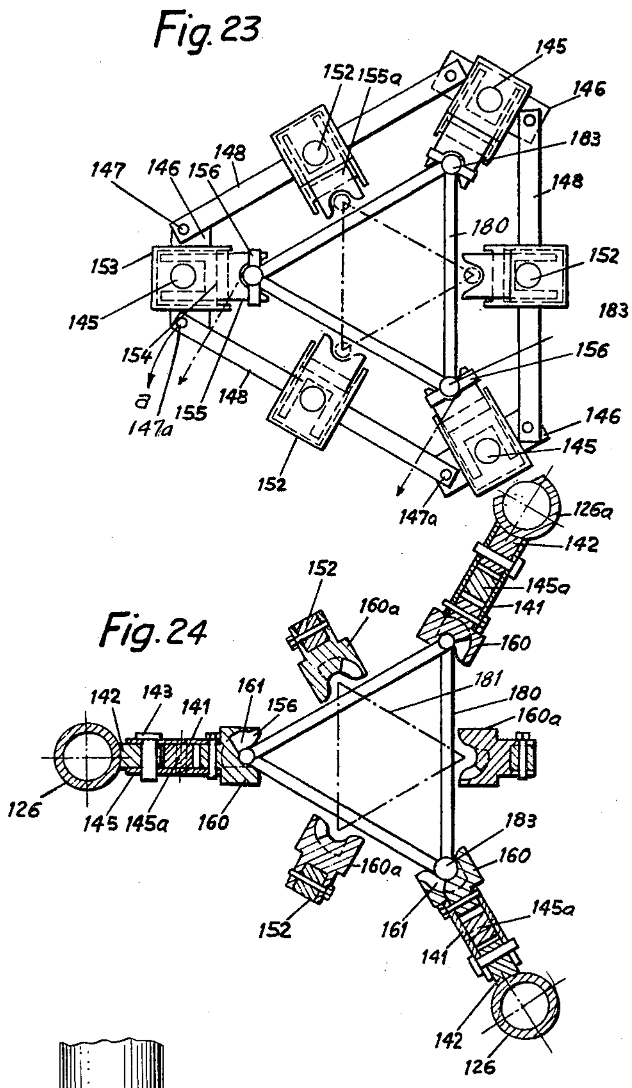
Figure 25A:
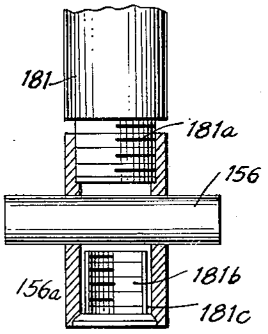

FIG. 20*a* is a hydraulically raisable elevating table insert;

FIG. 20*b* is a hydraulically operated and removable elevating table jack;

FIG. 21 is a view of a guide frame for mast sections of different lateral width;

FIG. 22 is a top view of the guide frame shown in FIG. 21;

FIG. 23 is a section taken along the line VIII—VIII in FIG. 21;

FIG. 24 is a section taken along the line IX—IX in FIG. 21;

FIG. 25 shows two lattice mast sections of different lateral width mounted one on top of the other;

FIG. 25*a* is an enlarged fragmentary section indicating the manner of joining the two sections together;

FIG. 26 is a top view of the mast sections shown in FIG. 25;

FIG. 27 shows two lattice masts sections of unequal lateral width telescoped into one another for purposes of transport.

Mounted on the chassis 1 of a vehicle is a rotatable framework 2. Said framework has two lateral shafts 3, about which the elevating and erecting device 4 for masts assembled from sections is arranged to swivel. This erecting device 4 with the erected mast 6 can be swung from the vertical into an inclined or horizontal position by means of two-way hydraulic power cylinders 5 and locked at any desired angle so that any point in the area can be reached, which is of particular advantage in the case of work masts. The erecting device is in principle the same as that described hereinafter in conjunction with FIGS. 3 to 15.

The erecting device has to keep the freely extended mast in position and is therefore provided for this purpose with a particularly robustly designed clamping or guide frame which is secured to sturdy columns in the erecting device, which columns are in turn supported on the ground. The forces which are led off into the guide frame are thus transmitted via the columns to the ground. The guide frame can be wheeled in and out of the erecting device. Thanks to it, the great clamping length required can be achieved even when space is very much at a premium, and a sufficiently high, free area to allow even long mast sections to be run out is formed in the erecting device.

Figures 1, 2:
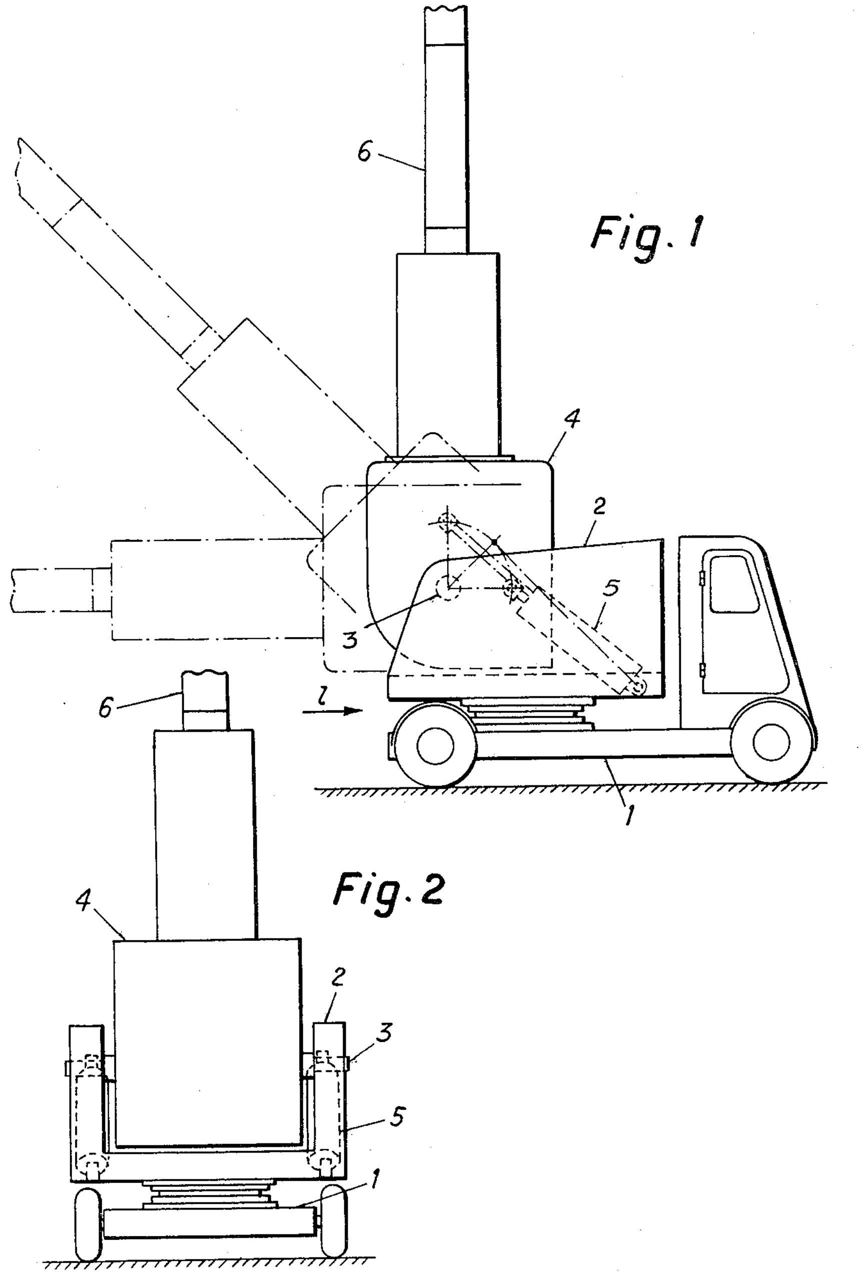
FIGS. 1–17 show an erecting device for masts consisting of tubes with round cross-section. In these figures.
Figure 3:
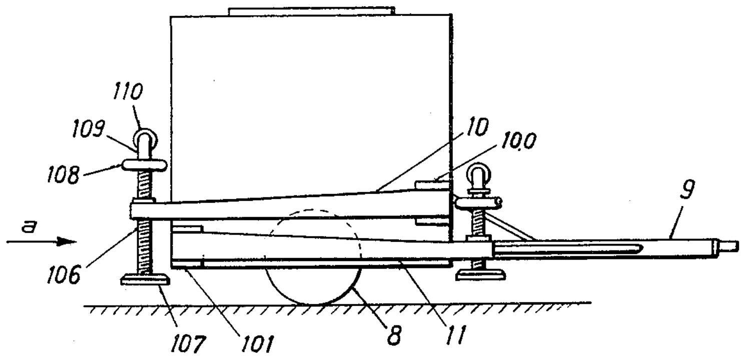
Figure 4:
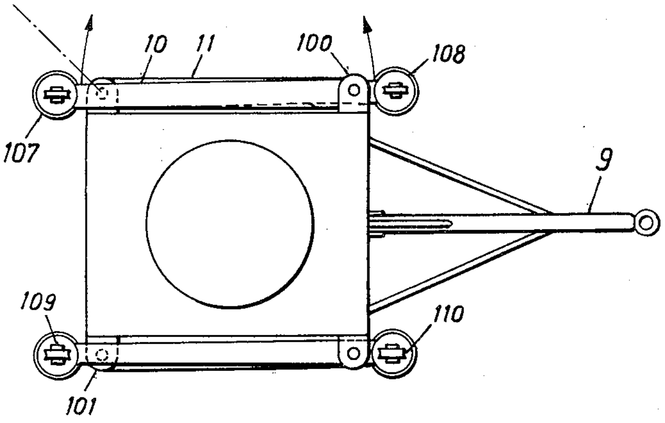

FIGS. 3 and 4 show the outlines of an erecting device in the form of a two-wheeled trailer for a highway or cross-country vehicle, in which trailer the means for assembling the mast sections are arranged. The erecting device shown in FIGS. 3 and 4 has two wheels 8, a shaft 9 and, on each side, two laterally swingable auxiliary supporting arms 10 and 11 which can be swung outwardly from the frame without interfering with each other. A possible embodiment of the design of such a trailer can be seen in FIGS. 5 to 8.

Figure 7:
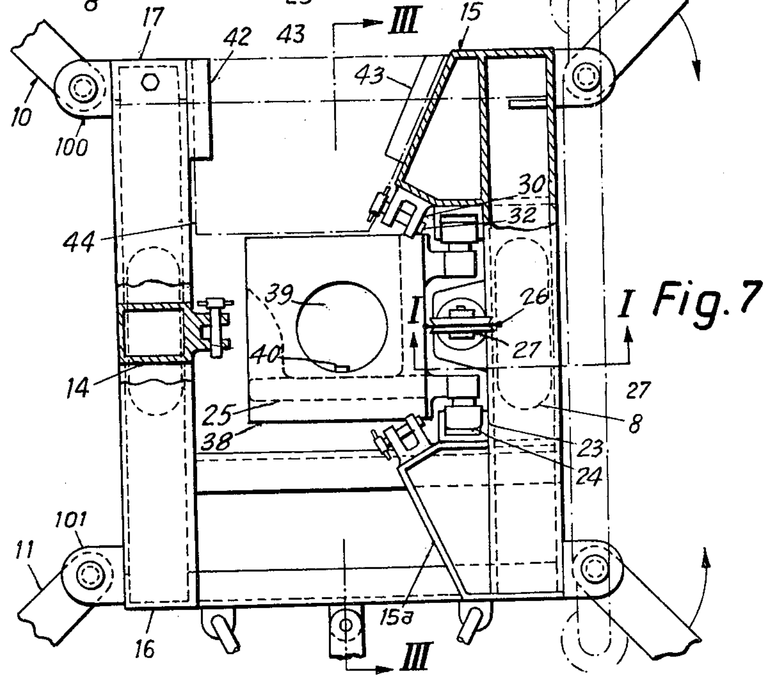
Figure 8:
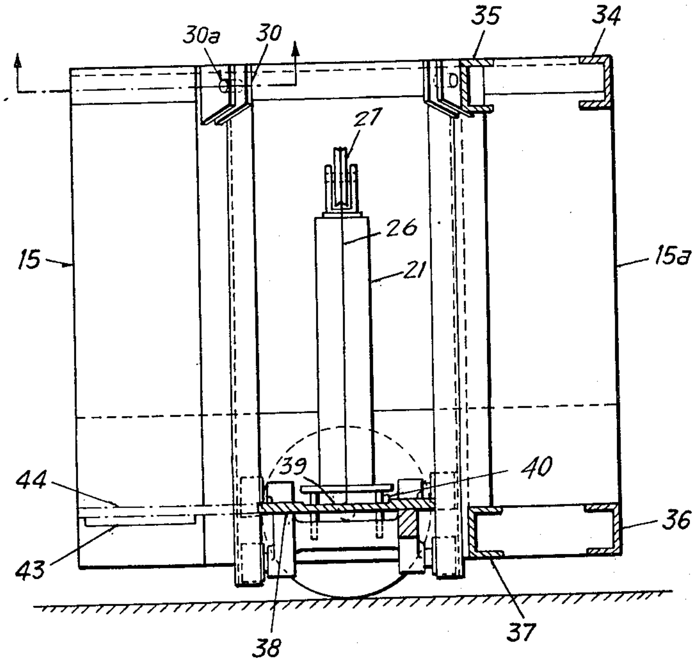
Figure 9:
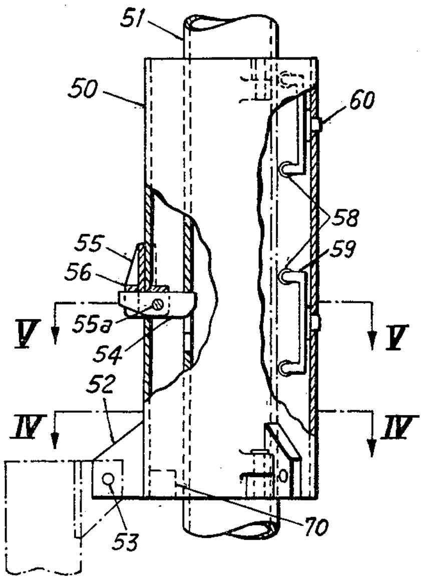
Figure 10:
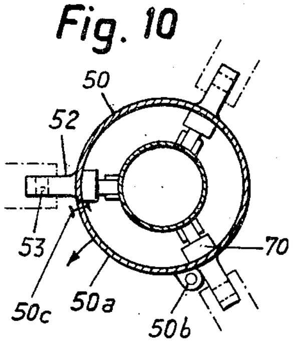
Figure 11:
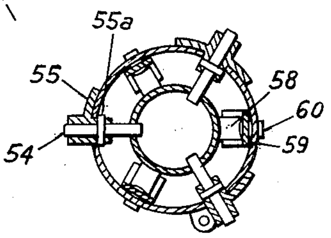

The trailer wheels 8 are mounted in two longitudinal rails 12 and **12*a* of U-shaped cross-section open at the bottom. The columns 14, 15 and 15*a* are secured to said rails 12. As will be described hereinafter, these columns serve as supports for the raised guide frame in which the mast sections are fitted together. U-sections 16 and 17 are rigidly welded to the ends of the rails 12*a* at right angles and are connected by means of the horizontal U-bar 18. The bar 18 thus connects the top ends of the two columns 16 and 17 and of the middle column 14. The rails 12 and 12*a*, together with U-sections 16 and 17 and the U-bar 18 thus comprise the frame member of the device. Welded to the rails 12*a* is a bracket 20 (FIG. 6) on which the lifting cylinder 21 of the hydraulic jack 21 is mounted. The columns 15 and 15*a* are connected at their top ends by the U-bar 22. U-bars 23, in which the guide rollers 24 of the lifting fork 25 which constitutes the lifting means for the mast sections, are mounted, and are secured vertically to the columns 15 and 15*a*. Columns 14, 15, and 15*a* thus constitute the guide means which serve to guide a guide frame which will be subsequently described in greater detail. Secured to the rail 12*a* is a tension member or wire rope 26 which is passed over the pulley 27 and fastened to the lifting fork 25. The pulley 27 is mounted on the piston rod 28 of the lifting cylinder 21. The lifting fork 25 thus travels double the distance of the piston rod 28. Secured to the columns 14, 15 and 15*a* are forks 30 which are provided with plug in bolts 32 and serve, as will be described hereinafter, as locking means for the guide frame 50 and hold the raised guide frame 50 firm (FIGS. 9 to 11). To enable the erecting device to be wheeled away from an assembled mast anchored on a seat and moored, said erecting device is open at the rear, i.e. on the side opposite the shaft when the device is designed as a trailer. In order to make sure that the device still has the necessary stability, cross connections 34 and 35 at the top and 36 and 37 at the bottom are arranged on the shaft side, as can be seen from FIG. 8. The lifting fork 25 is, as FIG. 7 shows, open at the rear. It can be covered with a removable plate 38 which serves as an elevating or lifting plate. The lifting plate has a recess 39 and a nose 40 which serve to centre and align the mast sections to be erected on the elevating means formed by the fork 25 and the lifting plate 38. To enable these mast sections to be conveniently slid on to the lifting plate 38, bearing strips 42 and 43 are welded to the vertical columns 15 and 17 (FIGS. 7 and 8), on which strips the bearing plate 44** can be laid.

Figure 5:
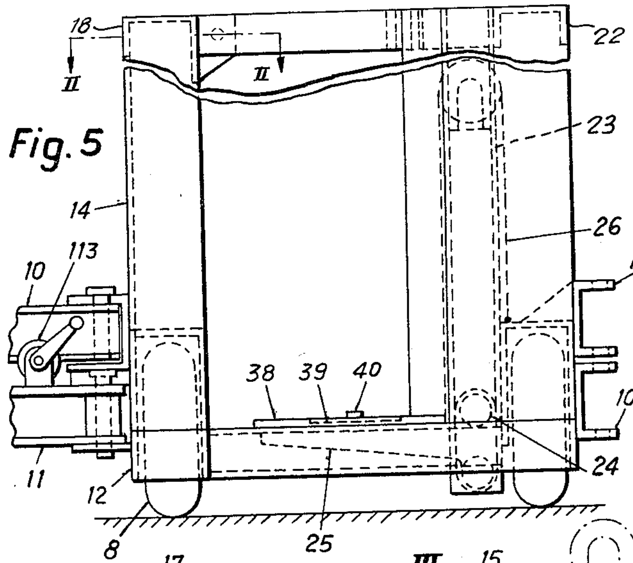
Figure 6:
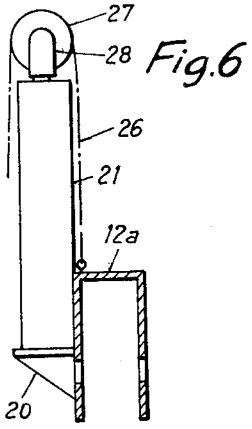

FIGS. 9 to 11 show the raisable guide frame 50 which serves to receive and fit the individual mast sections 51 (FIG. 12) together. This frame 50 has, by way of example, a circular cross-section. It may, however, also have a square or triangular cross-section. Welded to the bottom end of the frame 50 are three noses 52 provided with holes 53 which correspond to the bores **30*a* of the forks 30 (FIGS. 5 and 8). This frame 50 is furthermore provided with hinged levers 54 which are mounted in bearings 55, can rotate about the bolt 55*a* and are kept in the horizontal position by the stop 56. Said hinged levers 54 are designed to engage slots 57 of the mast sections 51 (FIG. 12) in order to hold them firm. Rollers 58 are provided to guide the mast sections 51 in the guide frame 50 and are mounted on brackets 59 which are supported by bolts 60 in the wall of the guide frame 50. These rollers guide each mast section while it is being raised. If the erecting device has to be driven away from an erected mast, the guide frame 50 is equipped with a door 50*a*, extending throughout the entire height of guide frame 50 and of a width larger than the width of the lowermost section of the erected mast which is arranged to swivel about the hinge 50*b* and can be locked in the closed position by means of the lock 50*c***. The opening of the door creates a passage for the erected mast and permits the withdrawal of the guide frame.

The individual mast sections 51 (FIGS. 12 and 13) have, welded to one of their ends, an internal collar **51*a* which serves to centre the mast sections when they are being fitted together. An external collar 51*b* is provided at the other end, which, when a thin-walled tube is used as a mast section, prevents the mast section ends from coming out of true. When the mast sections are joined together, the nose 51*c* engages a recess 51*d* so that the slots 57, in which the supporting levers 54 must engage, come into the correct angular position, which purpose is also served by the nose 40 arranged on the plate 38 of the lifting fork 25 and adapted to fit into the recess 51*d* of a mast section (FIGS. 5, 7 and 8). For the purpose of securing the mast sections to one another, the lower portions of said sections are provided with, by way of example, hooks 65 which are engaged by the stirrups 66 of the toggle-lever fastenings 67 on the upper portion of the following mast section. At the bottom end of the guide frame 50 means for locking a mast section are provided. These comprise projections 70 which are arranged on the said frame's inner wall. They face inwards and serve to close the toggle-levers 67** of the toggle-lever fastenings. Said projections may also have rifled grooves for the purpose of actuating a bayonet catch. The mast sections are all designed alike from top to bottom. They are therefore exchangeable and cannot be confused. They can be provided with holes or stirrups (not illustrated) which make it possible to climb the assembled mast and may serve at the same time as handles for transportation purposes.

Figure 14:
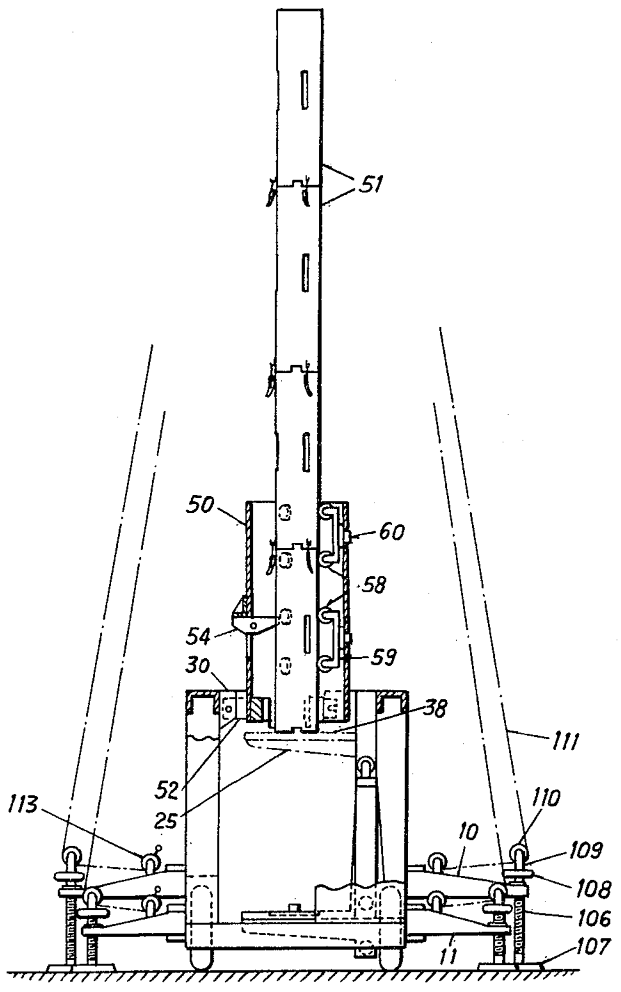
Figure 15:
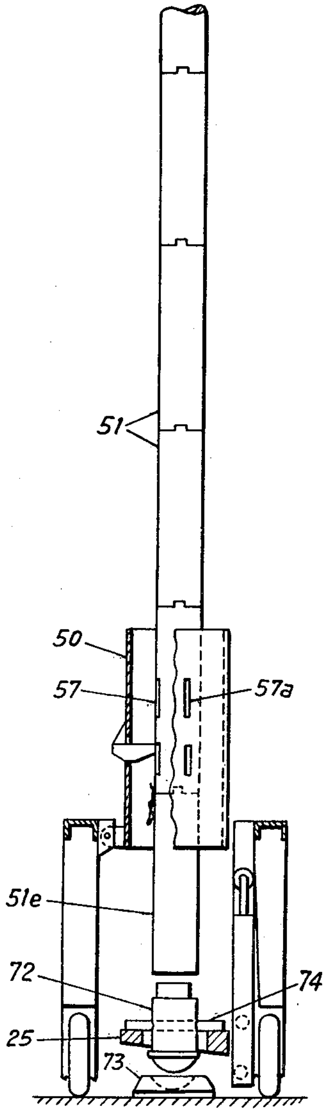

FIG. 14 shows a mast mounted on the guide frame 50 and moored to the supporting feet of the erecting device.

Figure 16:
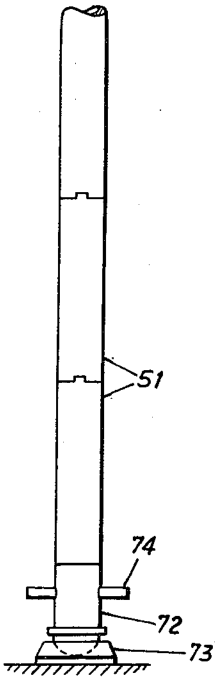

To enable the device to be moved away from a completely erected and moored mast, the latter must be provided with a pedestal 72 (FIGS. 15 and 16) which is lowered into a seat 73 on the ground. This pedestal is provided with a cross-bolt 74 which, after removal of the plate 38, comes to rest on the lifting fork 25 of the elevating device.

FIGS. 3, 4, 5, 7 and 14 show that fishplates 100, 101 are welded to the framework of the erecting device and that in said fishplates swivellable supporting arms 10 and 11 are mounted, to the ends of which supporting feet 107, provided with screws 106, are secured. Fastened to the top ends of the screws 106 are handwheels 108, over which rope pulley brackets 109 are swivellably mounted. Traction or guy ropes 111 are guided over said brackets' pulleys 110 to the winches 113. The supporting arms 10 and 11 are suitably secured to the trailer framework at different heights so that the two supporting arms, as FIG. 4 shows, can each be flexibly attached to a longitudinal wall of the erecting devices' framework and thus widen the latter by only a slight amount.

Figure 12:
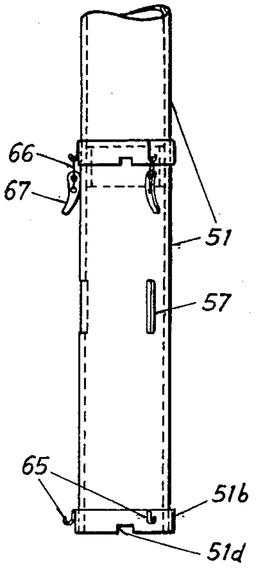
Figure 13:
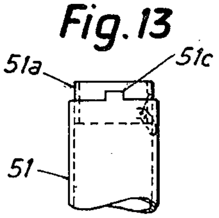

The operation of erecting a mast by means of the erecting device shown in FIGS. 1–17 is carried out as follows:

First of all, the guide frame 50 is raised by means of the elevating plate 38 and secured by means of the bolt 32 in the forks 30 of the columns 14, 15 and 15*a*. The guide frame can of course also be bolted directly to the top part of the lifting device and tilted along with the latter when it is swivelled. Then, the topmost mast section 51 of a mast to be built up is slid via the plate 44 (FIGS. 7 and 8) on to the elevating plate 38 of the lifting fork 25, centered in the recess 39 of the elevating plate 38 which forms the elevating table, and brought into the correct position by means of the nose 40 which engages the recess 51*d* of the mast section 51 (FIGS. 5, 7 and 12). The mast section 51 is now pushed through the frame 50 by raising the elevating table, the frame's supporting levers 54 (FIG. 9) snapping into the slots 57 of the mast section which, after a slight downward movement, remains suspended on the levers 54.

Figure 17:
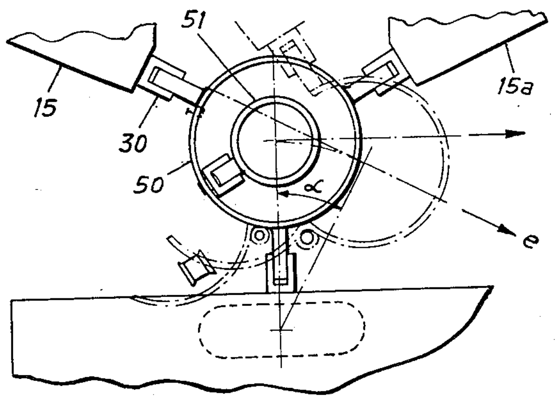

The mast section 51 is guided by the rollers 58. The elevating table is then lowered into its lowermost position and a second mast section is mounted on the said table in the manner described. When the second mast section is raised, its centering collar 51*a* slides into the bore of the first mast section 51 and the nose 51*c* moves into the recess 51*d*. At the same time the stirrups 66 of the toggle-lever fastenings 65*a* engage the hooks 65 and the toggle-levers 67 are pressed against the mast section 51 by the projections 70 arranged in the frame 50 so that the two mast sections are rigidly joined together. One mast section fits on to the next. It is suitable to provide on the topmost mast section rope eyes which are connected to winding drums 113 by ropes 111 via the pulleys 110. Once the desired height is attained except for one mast section, a section is inserted which has, besides the slots 57, other slots 57*a* in which the levers 54 can engage. The lowest mast section 51*e* (FIG. 15) is now raised just sufficiently to enable the levers 54 to engage the slots 57*a*, the sections having already been joined, however, by the toggle-lever fastenings. The plate 44 and the elevating table plate 38 (FIG. 7) are now removed and the pedestal 72 with its supporting bolt 74 is positioned on the fork 25 of the elevating table. By raising the lifting fork 25, the pedestal 72 is slid into the bottom end of the mast section 51*e* and the entire mast is raised until the levers 54 can be swung out of the slots 57*a* by hand. Now, the entire mast with its pedestal 72 can be lowered on to the seat 73. The ropes are then released from the winding drums 113 and anchored to the ground. It is also possible to fasten two ropes to the point of the mast so that the latter can be anchored to the ground before the ropes are released from the supporting feet of the erecting device. The door 50*a* of the guide frame 50 is now opened, as shown in FIG. 17, and, by swivelling the erecting device through the angle, the guide frame 50 and thus the forks 30 of the column 15 as well are moved out of the direction of travel so that the erecting device can now be driven away from the moored mast in the direction of arrow *e*.

The elevating and erecting device illustrated in FIGS. 18–27 is likewise designed as a two-wheeled trailer for a highway or cross-country vehicle.

In FIGS. 18 and 19 121 indicates the chassis of the trailer, the design of which does not require any closer description. It is provided with two wheels 122 and three supporting feet 123 which can be adjusted in height by means of lead screws 124. They serve only to fix the erecting device on the ground and to align its elevating device in an exactly vertical position. An insertable supporting structure 125 and 125*a* is provided for the purpose of supporting the erecting device when the mast has been run out.

Secured to the chassis 121 (FIGS. 18 and 19) are three vertical tubular columns 126 and 126*a* which serve to guide the elevating table 127. The latter is vertically guided by means of the rollers 128 and 129 on the column 126*a* and is prevented from rotating horizontally by means of the rollers 132 on the columns 126 (FIG. 19). The lifting piston 133 of the cylinder 134 causes, via the rope 135, the elevating table 127 to be raised and lowered. As FIG. 20 shows, the elevating table 127 can be provided with a vertically displaceable table plate insert 138 to enable upper and lower lattice mast sections to be attached together by interconnecting bolts—which are inserted in eyes formed in the sections. The elevating table insert 138 is raised by means of one or several springs 139 which are pretensioned to such an extent that they absorb the weight of a mounted lattice mast section. This arrangement enables the lattice mast sections to be reliably fitted together before the already joined lattice mast sections have to be raised with the elevating table. For heavy lattice mast sections, weighing, for instance, 200 kg. or more, the springs 139 would have to be pretensioned to such an extent that the table insert and thus the mast section can no longer be depressed by hand. In this case a pneumatically or hydraulically operated table insert 138*a* (FIG. 20*a*) is used instead of springs. FIG. 20*b* shows a hydraulic jack 140 of the table insert 138*c* which can be placed on the ground. The guide frame F is raised by means of the elevating table 127 and its fishplates 141 engage the lugs 142 of the framework columns 126 and 126*a* and are locked by bolts 143 (FIGS. 18 and 21).

The displaceable table plate insert serves to bring the lower mast section into engaging position with the upper mast section when the lifting table is in its lowermost position. A single mast section is then positioned on the table while simultaneously depressing the displaceable insert in downward direction. When the interengaging locking means of the lower mast section are in vertical coincidence with those of the upper mast section the insert may be made to rise either under the force of the spring 139 or under the effect of a pressure medium to therewith raise the lower mast section into position in which its locking means at the upper end engage into the locking means at the lower end of the upper mast section. In this position the locking means are ready to be locked by means of rotating the cross bolts.

The guide frame F consists of three columns 145 disposed at the apices of a triangle having equal sides (FIGS. 21–24), to the top and bottom of which cross yokes 146 are welded. Said cross yokes 146 are connected to the rails 148 by bolts 147 and 147*a* (FIGS. 22 and 23). Furthermore, brackets 149 are welded to the columns 145 between the rails 148 and are interconnected by means of bolts 150 and rails 151 (FIG. 21). The rails 148 and 151 are joined together by vertical columns 152. By removing two bolts 147 and 147*a* and one bolt 150*a*, the corresponding connecting rails 148 and 151 can be swung out in the direction of arrow *a* (FIGS. 22 and 23) so that, as already described in connection with the first embodiment, the erecting device can be driven away from the mast after the erected mast has been provided with a pedestal and moored by guy wires. Brackets 153 (FIGS. 21 and 23), in which retaining forks 155 are swivellably mounted and controlled by means of bolts 154, are welded to the columns 145. These retaining forks 155 support the cross arbors 156 of the fastening members which serve to lock two mast sections (FIG. 25) and are arranged at the bottom end of the three angle, columns 183, of the mast sections 180 and 181. The height of the brackets 153 and thus of the retaining forks 155 on the columns 145 is dependent on the height of the mast sections which are to be slid through the guide frame and on whether the mast sections are fitted together automatically or by means of the elevating table. The position illustrated is neutral.

The sections 181 are held together by providing the ends with threads **181*a* and the next adjacent member with threads 181*b*. The thread of the bottom member 181*b* is smaller in diameter and provided with two longitudinal recesses 181*c* which sub-divides it into two sectors. The member 156 is used for turning a pipe member 156*a* to secure each of the sectors 181** together.

The bottom ends **145*a* of the columns 145 have a rectangular cross-section. To them are secured the fishplates 141 which engage the lugs 142 of the frame columns 126 and 126*a* (FIG. 24) and can be locked with the bolts 143. Secured to said fishplates 141 are, furthermore, rifled guides 160 with curved guide recesses 161 (FIGS. 21 and 24), in which the cross bolts 156 are rotatably mounted and movable through 90° from an unfastened position into the position shown in FIG. 23. The cross bolts 156 thus serve to pin the upper mast section 180 to the lower mast section 180*a*. This construction is further detailed in applicant's copending application Serial No. 591,191, now abandoned. Furthermore, roller brackets 165 are secured to the columns 145 (FIGS. 21 and 22), in which brackets the guide rollers 166 are mounted. Said rollers are so shaped that they engage the circular vertical angle columns 183 of the lattice masts 180**.

In order to enable lattice masts of different lateral widths to be erected (FIGS. 25 and 26), roller brackets 170 with rollers 171 (FIGS. 21 and 22) are secured to the connecting rails 148. Said rollers are capable of guiding mast sections 181 of smaller lateral width (FIGS. 21, 22, 25 and 26). Said mast sections 181 are arranged so that they are at horizontal angle of 60° to the mast section 180. Three vertical columns 185 are welded to a mast section 180 which is designed as a link, and said columns, like all the mast sections, have connecting members and can thus be joined to a mast section of smaller lateral width. To enable the mast sections 181 to be interconnected, i.e. the cross arbors 156 to be turned, curved members **160*a* and retaining forks 155*a* for supporting the cross bolts 156 are arranged on the columns 152** of the guide frame F (FIGS. 23 and 24).

The wheeled elevating and erecting device according to FIGS. 18–27 operates as follows:

When the erecting device designed as a trailer has arrived at its destination, i.e. at the site where a mast is to be erected, it is unhooked from the towing vehicle. By means of the supporting feet 123 the trailer is positioned on the ground at the appointed site and so aligned that its guide frame F is exactly vertical. The guide frame F is raised by means of the elevating table 127 and locked with the chassis 121 by the bolt 143. First of all, a mast section 181 with a smaller lateral surface is placed on the elevating table, whereupon a transmitter or receiver head is mounted on the first mast section by means of a swinging crane 187 (FIG. 18) secured to the chassis 121. Then, other mast sections are slid on and joined together until the desired height is attained. Then, a mast section 180 with larger lateral surfaces is placed on the elevating table; said mast section has connecting tubes 185 (FIGS. 21 and 25) and joins same to the upper mast section. Now, mast sections 180 with large lateral surfaces continue to be run out until the desired mast height is reached. When the mast is erected, guy wires, which are passed over the pulleys and winches of the extended supporting arms 125 and **125*a***, serve to hold the mast section. If a mast has to be assembled from more than two sections of different size, several auxiliary guide frames, which are designed exactly as the one described, can be arranged one inside the other. The result is then a mast in which the topmost sections with the smallest lateral width are mounted on the following sections at a horizontal angle of 60°. Said sections are located in the same way on the following sections, but are connected by the auxiliary guide frame acting as an intermediate member. The auxiliary guide frame is also run out and thus releases the space for the following larger mast sections.

The erecting devices shown in FIGS. 1 to 8 and 18 and 19 are two-wheel trailers which are designed solely for the purpose of erecting masts. These trailers are suitably provided with a platform, the height of which corresponds to the bearing surface of the elevating table (FIGS. 18 and 19), the platform being chosen spacious enough to enable all the mast sections required for one mast to be placed upright and side by side on it. Triangular lattice mast sections are particularly advantageous to use as they can be placed side by side to save space (honeycomb arrangement) and stacked inside one another if they have different lateral widths (FIG. 27). Furthermore, a combustion engine or an electric motor 189 with attached hydraulic pump and/or air compressor 190 can be arranged on the platform and used both to feed the elevating device and to operate a rock drill designed to make the holes for inserting the guy wire anchors in rocky country.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A mobile elevating and erecting device for masts assembled from separate sections without requiring support of guy ropes; comprising a frame member, vertical guide means connected to said frame member, a guide frame displaceable in said vertical guide means and secured at a predetermined height relative to said guide means, said guide frame being further adapted to receive a mast section, first locking means for securing said guide frame at said predetermined height to said vertical guide means, lifting means vertically movable within said guide means for raising each mast section when supported thereon into a raised locking position for facilitating joining each subsequent mast section to a preceding mast section in linear end-to-end abutting relationship, second locking means in said guide frame for locking said mast sections in said locking position when said lifting means is lowered for receiving a further mast section, power means on said frame member operatively connected to said lifting means for raising and lowering said lifting means, said guide frame being of a triangular cross-section and comprising three vertical columns disposed at the apices of a triangle having equal sides, a plurality of rail members transversely securing said columns to one another, first guide means in said guide frame for guiding mast sections of triangular shape, second guide means in said guide frame for guiding mast sections of triangular shape of smaller lateral width, said first guide means consisting of at least one pair of brackets secured to each of said vertical columns and spaced from each other, guide rollers rotatably secured on each of said brackets, said second guide means consisting of brackets secured to each of said rail members centrally thereof, whereby a mast section of triangular shape and of lateral width corresponding to said first guide means may be guided through said first guide means, and a mast section of triangular shape and of a smaller lateral width corresponding to said second guide means may be guided through said second guide means.

2. A mobile elevating and erecting device for masts assembled from separate sections without requiring support of guy ropes; comprising a frame member, vertical guide means connected to said frame member, a guide frame displaceable in said vertical guide means and secured at a predetermined height relative to said guide means, said guide frame being further adapted to receive a mast section, first locking means for securing said guide frame at said predetermined height to said vertical guide means, lifting means vertically movable within said guide means for raising each mast section when supported thereon into a raised locking position for facilitating joining each subsequent mast section to a preceding mast section in linear end-to-end abutting relationship, second locking means in said guide frame for locking said mast sections in said locking position when said lifting means is lowered for receiving a further mast section, said second locking means comprising swivellably mounted retaining forks for supporting cross arbors of fastening members of adjoining mast sections, and power means on said frame member operatively connected to said lifting means for raising and lowering said lifting means.

3. A mobile elevating and erecting device for masts assembled from separate sections without requiring support of guy ropes; comprising a frame member, vertical guide means connected to said frame member, a guide frame displaceable in said vertical guide means and secured at a predetermined height relative to said guide means, said guide frame being further adapted to receive a mast section, first locking means for securing said guide frame at said predetermined height to said vertical guide means, lifting means vertically movable within said guide means for raising each mast section when supported thereon into a raised locking position for facilitating joining each subsequent mast section to a preceding mast section in linear end-to-end abutting relationship, second locking means in said guide frame for locking said mast sections in said locking position when said lifting means is lowered for receiving a further mast section, said lifting means including a lifting table having a recess portion, a plate insert in said recess portion and spring means in said recess portion urging said plate upwardly and power means on said frame member operatively connected to said lifting means for raising and lowering said lifting means.

4. A mobile elevating and erecting device for masts assembled from separate sections without requiring support of guy ropes; comprising a frame member, vertical guide means connected to said frame member, a guide frame displaceable in said vertical guide means and secured at a predetermined height relative to said guide means, said guide frame being further adapted to receive a mast section, first locking means for securing said guide frame at said predetermined height to said vertical guide means, lifting means vertically movable within said guide means for raising each mast section when supported thereon into a raised locking position for facilitating joining each subsequent mast section to a preceding mast section in linear end-to-end abutting relationship, second locking means in said guide frame for locking said mast sections in said locking position when said lifting means is lowered for reeciving a further mast section, said lifting means being provided with a lifting table having a recess portion, a plate insert in said recess portion and pneumatic power means connected with said recess portion for operating said plate insert, and power means on said frame member operatively connected to said lifting means for raising and lowering said lifting means.

References Cited in the file of this patent

UNITED STATES PATENTS

| | | |
|---|---|---|
| 37,207 | Welham | Dec. 16, 1862 |
| 1,188,283 | Le Blanc | June 20, 1916 |
| 1,319,943 | Bessolo | Oct. 28, 1919 |
| 2,399,632 | Guerin | May 7, 1946 |
| 2,402,579 | Ross | June 25, 1946 |
| 2,595,307 | Selberg | May 6, 1952 |
| 2,705,363 | Anderson | Apr. 5, 1955 |
| 2,725,959 | Plano et al. | Dec. 6, 1955 |
| 2,857,994 | Sheard | Oct. 28, 1958 |

FOREIGN PATENTS

| | | |
|---|---|---|
| 1,052,678 | France | Sept. 23, 1953 |
| 1,112,760 | France | Nov. 23, 1955 |